United States Patent
Noll (10) Patent No.: US 10,524,415 B2
(45) Date of Patent: Jan. 7, 2020

(54) DRIVE ARM ASSEMBLY OF A HEADER OF AN AGRICULTURAL HARVESTER HAVING AN ADJUSTABLE SPHERICAL KNIFE HEAD BEARING

(71) Applicant: CNH Industrial America LLC, New Holland, PA (US)

(72) Inventor: Blaine Noll, Fleetwood, PA (US)

(73) Assignee: CNH Industrial America LLC, New Holland, PA (US)

( * ) Notice: Subject to any disclaimer, the term of this patent is extended or adjusted under 35 U.S.C. 154(b) by 149 days.

(21) Appl. No.: 15/728,899

(22) Filed: Oct. 10, 2017

(65) Prior Publication Data

US 2019/0104677 A1 Apr. 11, 2019

(51) Int. Cl.
*A01D 34/54* (2006.01)
*A01D 34/43* (2006.01)
*A01D 41/14* (2006.01)

(52) U.S. Cl.
CPC ............ *A01D 34/54* (2013.01); *A01D 34/43* (2013.01); *A01D 41/14* (2013.01)

(58) Field of Classification Search
CPC ...... A01D 34/30; A01D 34/145; A01D 34/02; A01D 34/305; A01D 34/33; A01D 34/13; A01D 34/14; A01D 41/14; A01D 34/06; A01D 34/28; A01D 34/32; A01D 34/54; A01D 34/43; F16C 2310/00; F16C 23/082; F16C 23/06
See application file for complete search history.

(56) References Cited

U.S. PATENT DOCUMENTS

| | | | |
|---|---|---|---|
| 681,950 A | 9/1901 | Clark | |
| 943,266 A | 12/1909 | Pelton | |
| 2,946,171 A | 7/1960 | Yeske | |
| 3,121,303 A | 2/1964 | Tomlinson et al. | |
| 3,577,716 A | 5/1971 | McCarty et al. | |
| 4,023,333 A | 5/1977 | Anderson | |
| 4,272,948 A * | 6/1981 | Dolberg | A01D 34/13 56/246 |
| 4,331,367 A * | 5/1982 | Trudeau | F16C 23/045 384/202 |
| 4,418,520 A * | 12/1983 | Schneider | A01D 34/13 56/297 |
| 4,813,291 A * | 3/1989 | Schumacher, II | A01D 34/30 384/434 |
| 4,909,025 A * | 3/1990 | Reissig | A01D 34/305 56/257 |

(Continued)

OTHER PUBLICATIONS

Extended European Search Report for EP Application No. 18198424.6 dated Mar. 6, 2019 (7 pages).

*Primary Examiner* — Arpad Fabian-Kovacs
(74) *Attorney, Agent, or Firm* — Peter K. Zacharias; Patrick M. Sheldrake (57) ABSTRACT

A header for a combine harvester comprising a drive arm assembly, bearing assembly and knife head assembly is disclosed. The drive arm assembly includes a drive arm with a proximal end operatively connected to a drive mechanism for reciprocating motion therewith and a distal end opposite the proximal end. The bearing assembly is attachable to the distal end of the drive arm and includes an eccentric hub. The knife head assembly includes a knife head and a housing mounted to the knife head. The housing houses the bearing assembly.

20 Claims, 11 Drawing Sheets

(56) References Cited

U.S. PATENT DOCUMENTS

| | | | | |
|---|---|---|---|---|
| 7,121,074 B1* | 10/2006 | Regier | ............ | A01D 34/305 |
| | | | | 56/296 |
| 7,520,118 B1* | 4/2009 | Priepke | ............ | A01D 34/30 |
| | | | | 56/257 |
| 7,743,592 B2 | 6/2010 | Schumacher et al. | | |
| 7,950,212 B1* | 5/2011 | Figgins | ............ | A01D 41/14 |
| | | | | 56/181 |
| 8,011,272 B1* | 9/2011 | Bich | ............ | A01D 34/305 |
| | | | | 56/299 |
| 8,051,633 B2 | 11/2011 | Figgins et al. | | |
| 8,282,287 B2 | 10/2012 | Martinez et al. | | |
| 9,192,097 B2* | 11/2015 | Cook | ............ | A01D 34/40 |
| 9,357,696 B2* | 6/2016 | Ritter | ............ | A01D 34/02 |
| 9,538,703 B2 | 1/2017 | Cook et al. | | |
| 9,961,828 B2* | 5/2018 | Cook | ............ | A01D 34/04 |
| 2009/0145097 A1* | 6/2009 | Priepke | ............ | A01D 34/30 |
| | | | | 56/257 |
| 2009/0145264 A1* | 6/2009 | Priepke | ............ | A01D 34/30 |
| | | | | 74/84 R |
| 2010/0209033 A1* | 8/2010 | Martinez | ............ | A01D 34/33 |
| | | | | 384/477 |
| 2011/0078989 A1* | 4/2011 | Bich | ............ | A01D 34/145 |
| | | | | 56/14.5 |
| 2014/0215995 A1* | 8/2014 | Cook | ............ | A01D 34/145 |
| | | | | 56/301 |
| 2014/0230398 A1* | 8/2014 | Cook | ............ | A01D 34/14 |
| | | | | 56/298 |
| 2014/0345239 A1* | 11/2014 | Cook | ............ | A01D 34/145 |
| | | | | 56/10.1 |
| 2015/0163994 A1* | 6/2015 | Bich | ............ | A01D 34/14 |
| | | | | 56/299 |
| 2016/0073586 A1 | 3/2016 | Biggerstaff | | |
| 2017/0265383 A1* | 9/2017 | Cook | ............ | A01D 34/145 |

* cited by examiner

DRIVE ARM ASSEMBLY OF A HEADER OF AN AGRICULTURAL HARVESTER HAVING AN ADJUSTABLE SPHERICAL KNIFE HEAD BEARING

FIELD OF THE INVENTION

The subject disclosure relates generally to a header for use with combine harvesters. In particular, the subject disclosure relates to a drive arm assembly for a header having an adjustable spherical knife head bearing for adjusting a height of a knife head assembly.

BACKGROUND OF THE INVENTION

An agricultural harvester e.g., a plant cutting machine, such as, but not limited to, a combine or a windrower, generally includes a header operable for severing and collecting plant or crop material as the harvester is driven over a crop field. The header has a cutting assembly for severing the plants or crops, such as an elongate sickle mechanism that reciprocates sidewardly relative to draper belts for transporting the cut crop toward a central location.

A larger/wider header allows for faster crop field clearing. However, the larger a header is, the more difficult it becomes to maintain efficient crop gathering because the lateral edges of the header flex as the edges experience changes in terrain, e.g., elevation. This flexing creates unnecessary strain on the header and cutting mechanism if not properly accounted for. Additionally, changes in elevation cause crop to go to waste if such flexing causes the cutting mechanism to cut above the stalk of the crop.

Thus, there is still a need for a header that can allow an operator to easily adjust the height of the cutting assembly to optimize header performance and achieve efficient harvesting operations. The exemplary embodiments of the subject disclosure address the foregoing issues of conventional headers.

BRIEF SUMMARY OF THE INVENTION

The present exemplary embodiments of the subject disclosure provide a drive arm assembly for a header having an adjustable spherical knife head bearing for adjusting a height of a knife head assembly.

In accordance with an exemplary embodiment of the subject disclosure, there is provided a header for a combine harvester that comprises a drive arm assembly, a bearing assembly and a knife head assembly. The drive arm assembly includes a drive arm having a proximal end operatively connected to a drive mechanism for reciprocating motion therewith and a distal end opposite the proximal end. The bearing assembly is attachable to the distal end of the drive arm and includes an eccentric hub. The knife head assembly includes a knife head and a housing mounted to the knife head. The housing houses the bearing assembly.

In an aspect of the exemplary embodiment, the bearing assembly further includes an annular bearing circumscribing the eccentric hub. The annular bearing includes a spherical outer surface. The housing further includes a cavity for receiving the spherical outer surface of the annular bearing. The annular bearing is mounted within the housing defining a ball and socket joint. The housing further includes an inner bearing for engaging with the bearing assembly. The inner bearing includes a concave bearing surface or substantially concave bearing surface.

In another aspect of the exemplary embodiment, the eccentric hub includes a flange extending from an elongated cylindrical body. The eccentric hub is rotatable relative to the drive arm. Additionally, the eccentric hub is rotatable about an axis parallel or substantially parallel with a longitudinal axis of the drive arm. The eccentric hub further includes a first through hole configured to receive a first fastener for connection to the drive arm and a second through hole configured to receive a second fastener. The first through hole is offset from a central longitudinal axis of the drive arm and the second through hole is offset from the central longitudinal axis of the drive arm. The eccentric hub is rotatable about a central longitudinal axis of the first through hole. The second through hole is an elongated curved slot.

In yet another aspect of the exemplary embodiment, the eccentric hub includes a first fastener connecting the eccentric hub to the drive arm and a second fastener connecting the eccentric hub to the drive arm. The eccentric hub is movable between a first position and a second position relative to the second fastener. Rotation of the eccentric hub moves the knife head assembly between a first position and a second position. Additionally, reciprocating motion of the drive arm assembly drives linear motion or substantially linear motion of the knife head assembly along a direction parallel or substantially parallel to a longitudinal length of the knife head. The housing can be integrally formed with the knife head.

In accordance with another exemplary embodiment of the subject disclosure, there is provided a drive arm assembly for a combine harvester that comprises a drive arm and a bearing assembly. The drive arm includes a proximal end for operative connection to a drive mechanism for reciprocating motion therewith and a distal end opposite the proximal end. The bearing assembly is attachable to the distal end of the drive arm and includes an eccentric hub mounted within an annular bearing having a curved outer surface.

In accordance with yet another exemplary embodiment of the subject disclosure, there is provided a spherical bearing installed on a knife head. In an aspect of the exemplary embodiment, the spherical bearing is positioned perpendicular to the knife head. An eccentric hub is positioned inside of the spherical bearing and attached to a pitman arm, e.g., a drive arm. A mounting hole of the eccentric hub is offset from the center of the eccentric hub. As a result, an operator can turn the eccentric hub, thereby changing the height of the sickle to facilitate optimal operating settings.

In accordance with the exemplary embodiments of the subject disclosure, by placing a spherical bearing perpendicular to the knife head, multiple degrees of freedom allow for misalignment while allowing the knife head to sit flat against ledger surfaces. The subject disclosure provides an eccentric hub for the spherical bearing. By offsetting the mounting bolt in the eccentric hub, an operator will be able to rotate the eccentric hub to change the height of the knife head. In an aspect, a slot and a second fastener, e.g., a bolt may be used to securely tighten the eccentric hub during harvesting operations.

Advantageously, the spherical bearing allows for misalignment caused from manufacturing tolerances. The knife head can sit flat no matter what angle the drive arm is positioned at relative to the guards. The eccentric hub allows single point adjustment for the height of the knife head instead of shimming or loosening the drive arm. In sum, the eccentric hub is positioned within the spherical bearing and allows an operator to adjust the height of the knife head by rotating the eccentric hub.

Other features and advantages of the subject disclosure will be apparent from the following more detailed description of the exemplary embodiments, taken in conjunction with the accompanying drawings which illustrate, by way of example, the principles of the subject disclosure.

BRIEF DESCRIPTION OF THE SEVERAL VIEWS OF THE DRAWINGS

The foregoing summary, as well as the following detailed description of the exemplary embodiments of the subject disclosure, will be better understood when read in conjunction with the appended drawings. For the purpose of illustrating the subject disclosure, there are shown in the drawings exemplary embodiments. It should be understood, however, that the invention is not limited to the precise arrangements and instrumentalities shown.

DETAILED DESCRIPTION OF THE INVENTION

Reference will now be made in detail to the various exemplary embodiments of the subject disclosure illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject disclosure in any manner not explicitly set forth. Additionally, the term "a," as used in the specification, means "at least one." The terminology includes the words above specifically mentioned, derivatives thereof, and words of similar import.

The terms "grain," "ear," "stalk," "leaf," and "crop material" are used throughout the specification for convenience and it should be understood that these terms are not intended to be limiting. Thus, "grain" refers to that part of a crop which is harvested and separated from discardable portions of the crop material. The header of the exemplary embodiments is applicable to a variety of crops, including but not limited to wheat, soybeans and small grains. The terms "debris," "material other than grain," and the like are used interchangeably.

"About" as used herein when referring to a measurable value such as an amount, a temporal duration, and the like, is meant to encompass variations of ±20%, ±10%, ±5%, ±1%, or ±0.1% from the specified value, as such variations are appropriate.

"Substantially" as used herein shall mean considerable in extent, largely but not wholly that which is specified, or an appropriate variation therefrom as is acceptable within the field of art.

Throughout this disclosure, various aspects of the subject disclosure can be presented in a range format. It should be understood that the description in range format is merely for convenience and brevity and should not be construed as an inflexible limitation on the scope of the exemplary embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the subject disclosure may be combined in any suitable manner in one or more embodiments. One skilled in the relevant art will recognize, in light of the description herein, that the exemplary embodiments can be practiced without one or more of the specific features or advantages of a particular embodiment. In other instances, additional features and advantages may be recognized in certain embodiments that may not be present in all exemplary embodiments of the subject disclosure.

Figure 1:
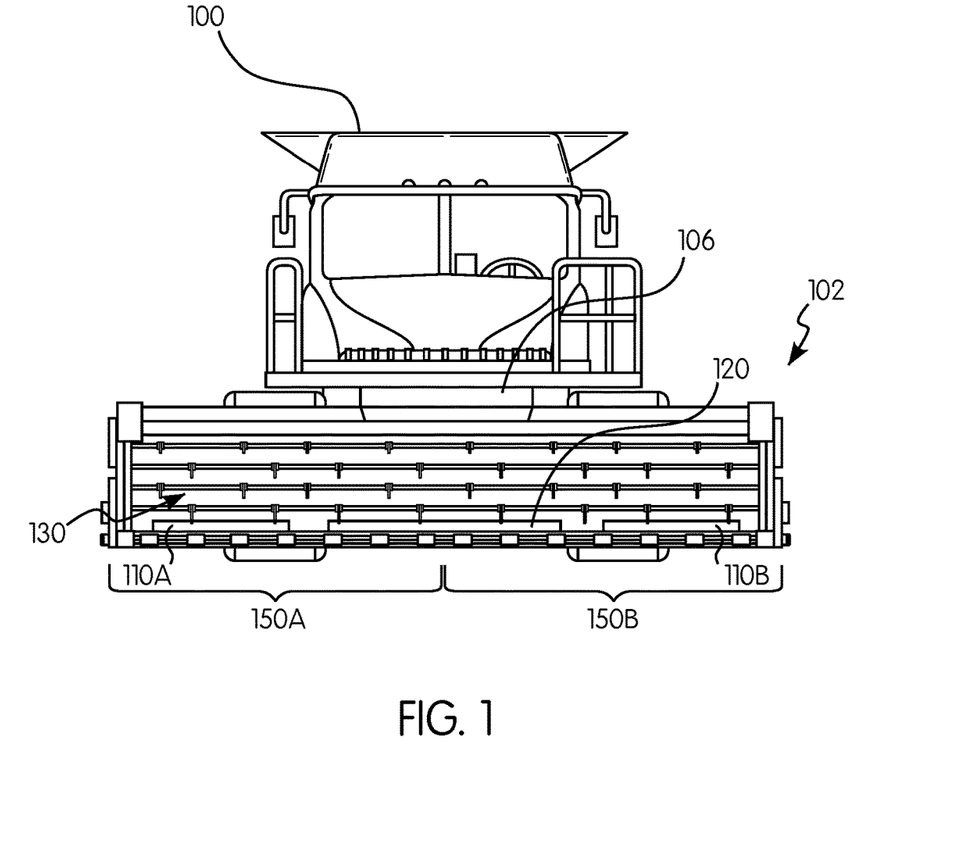
FIG. 1 is a front elevation view of a combine harvester including a header in accordance with an exemplary embodiment of the subject disclosure.

Referring now to FIG. 1, there is illustrated an agricultural harvester 100 in accordance with an exemplary embodiment of the subject disclosure. For exemplary purposes only, the agricultural harvester is illustrated as a combine harvester. The harvester 100 includes a header 102 having a first side draper 110A, a second side draper 1106, a central draper 120, an elongate transversely extending reel 130, a first cutting assembly 150A, and a second cutting assembly 1506. The first and second cutting assemblies 150A, 1506 are essentially identical, albeit mirror images, and therefore details hereto will be provided only as to the first cutting assembly 150A. However, it is understood that the first and second cutting assemblies need not be identical and that the second cutting assembly 1506 can be arranged in ways commonly known in the art.

The header 102 is attached to a forward end of the harvester 100 and is configured to cut crops, including (without limitation) small grains (e.g., wheat, soybeans, grain, etc.), and to induct the cut crops into a feederhouse 106 as the harvester 100 moves forward over a crop field.

The reel 130 is configured to facilitate gathering crop and moving crop cut by the first and second cutting assemblies 150A, 150B onto the drapers 110A, 110B, and 120. The side drapers 110A, 110B transport cut crop and deposit it on the center draper 120, which transports it to the feederhouse 106 of the harvester for threshing and cleaning. Although the header 102 is illustrated and described as including a reel 130, other embodiments of the header, such as embodiments in which the header includes an auger rather than a reel or an auger in addition to the reel, are contemplated. Furthermore, while the foregoing aspects of the harvester are being described with respect to the header shown, the cutting assembly of the subject disclosure can be applied to any other header having use for such a cutting assembly.

Figure 2A:
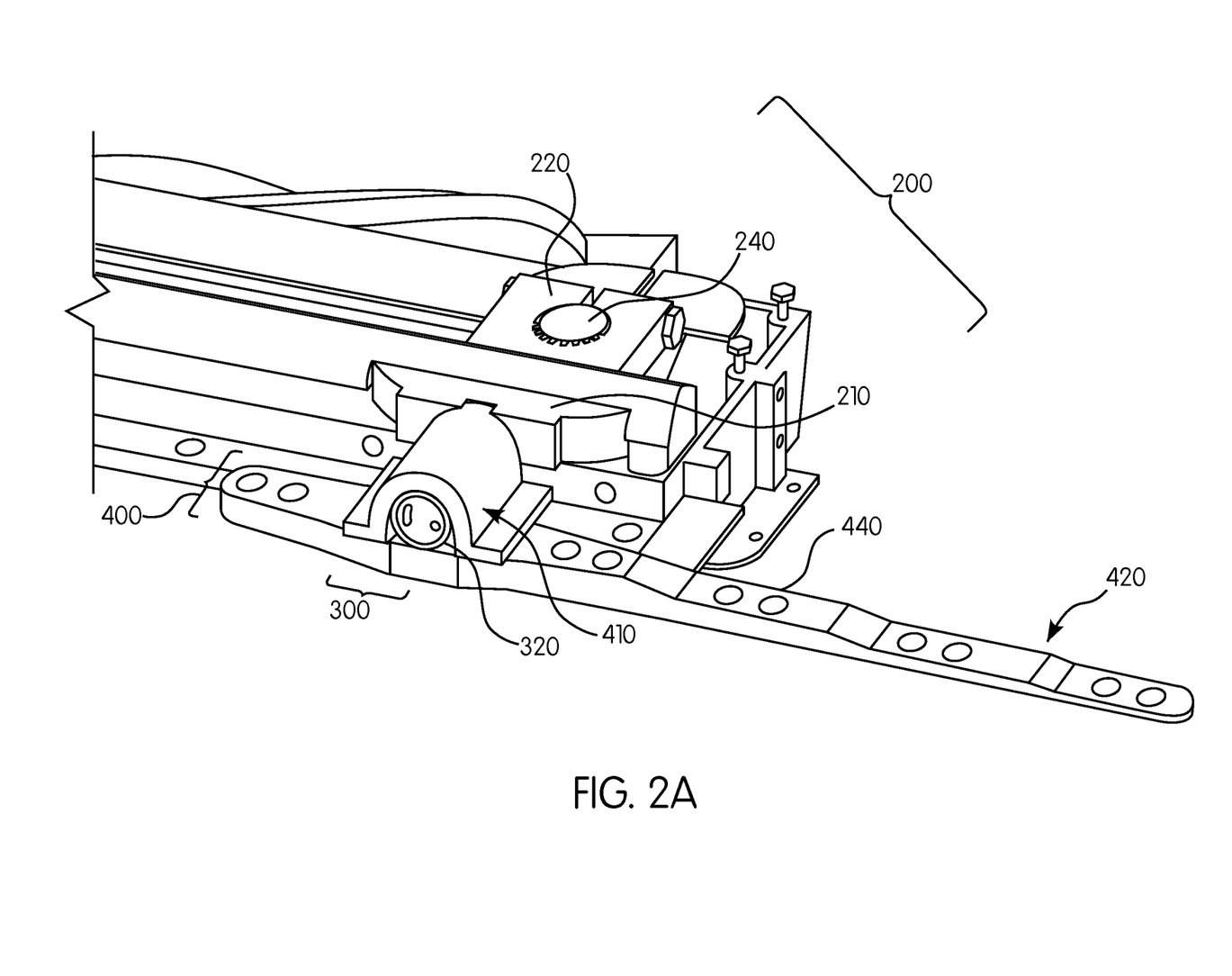
FIG. 2A is a partial perspective view of a drive arm assembly of the combine harvester of FIG. 1 in accordance with an exemplary embodiment of the subject disclosure.
Figure 2B:
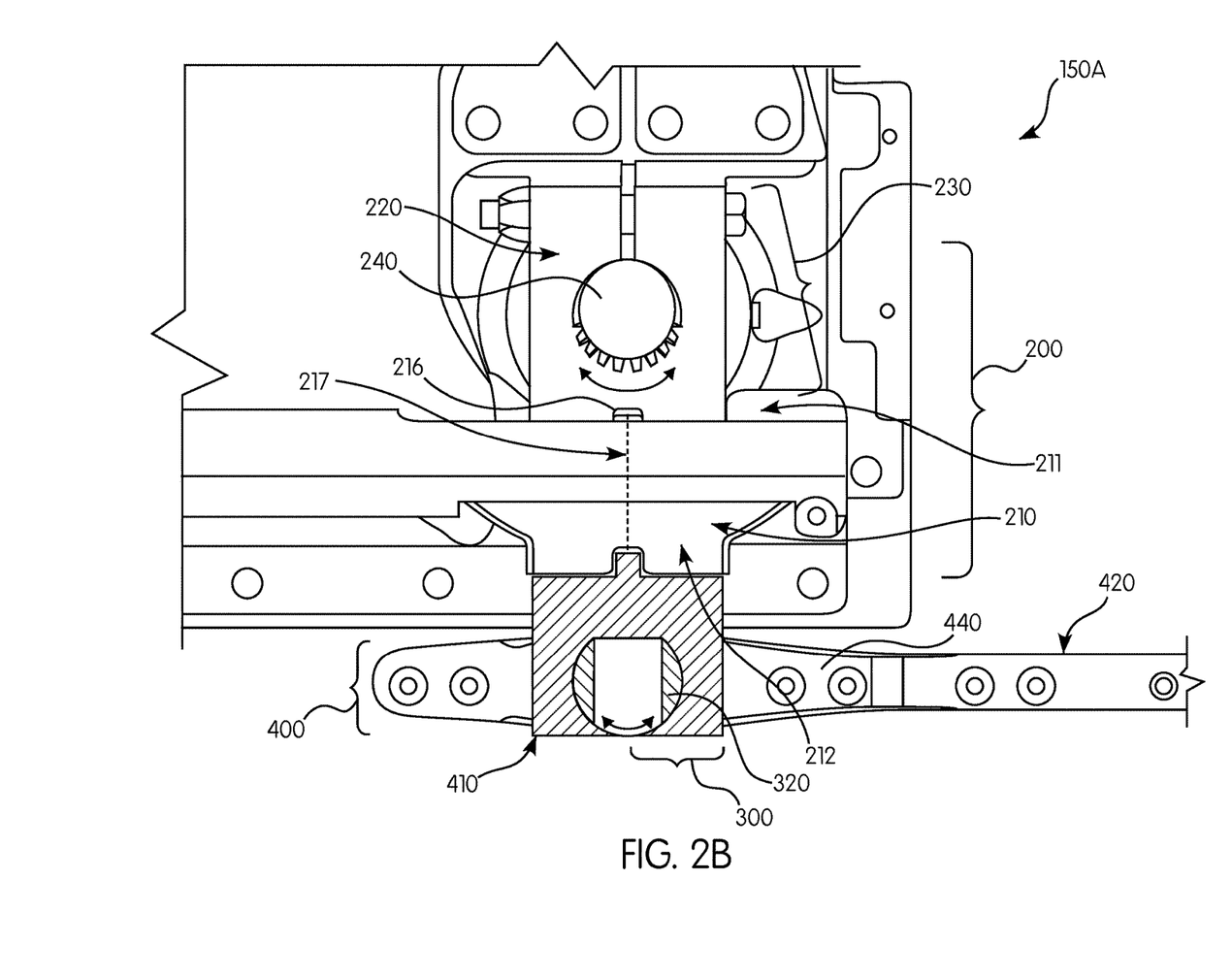
FIG. 2B is a partial cross-sectional top plan view of the drive arm assembly of FIG. 2A.
Figure 16:
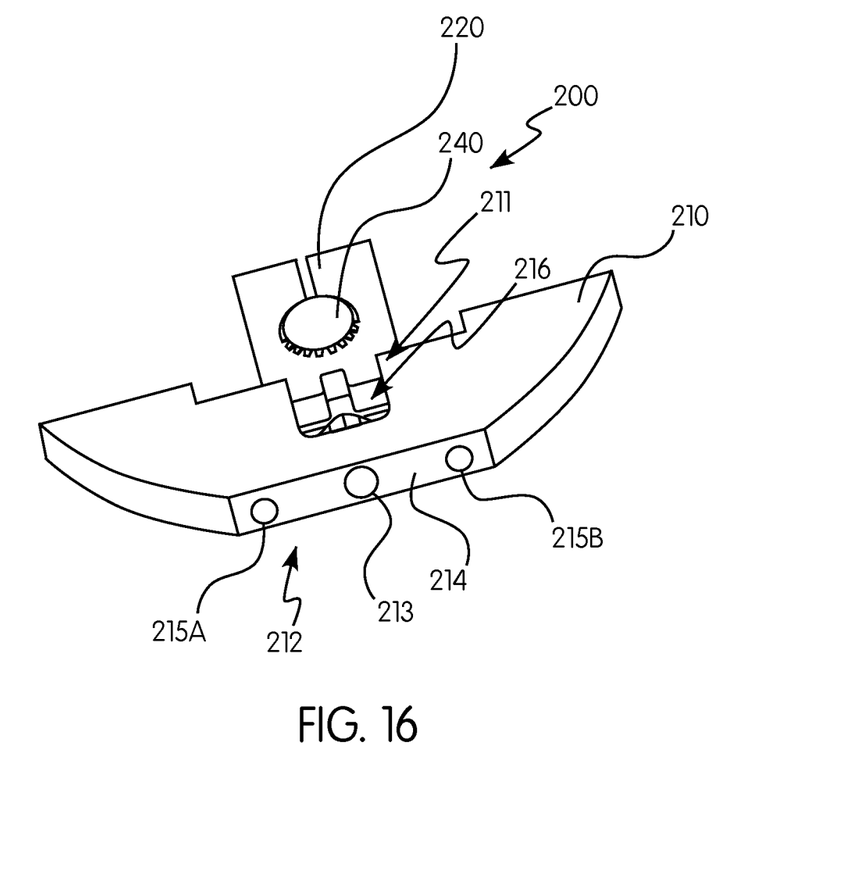
FIG. 16 is a perspective view of a drive arm assembly in accordance with an exemplary embodiment of the subject disclosure.
Figure 17:
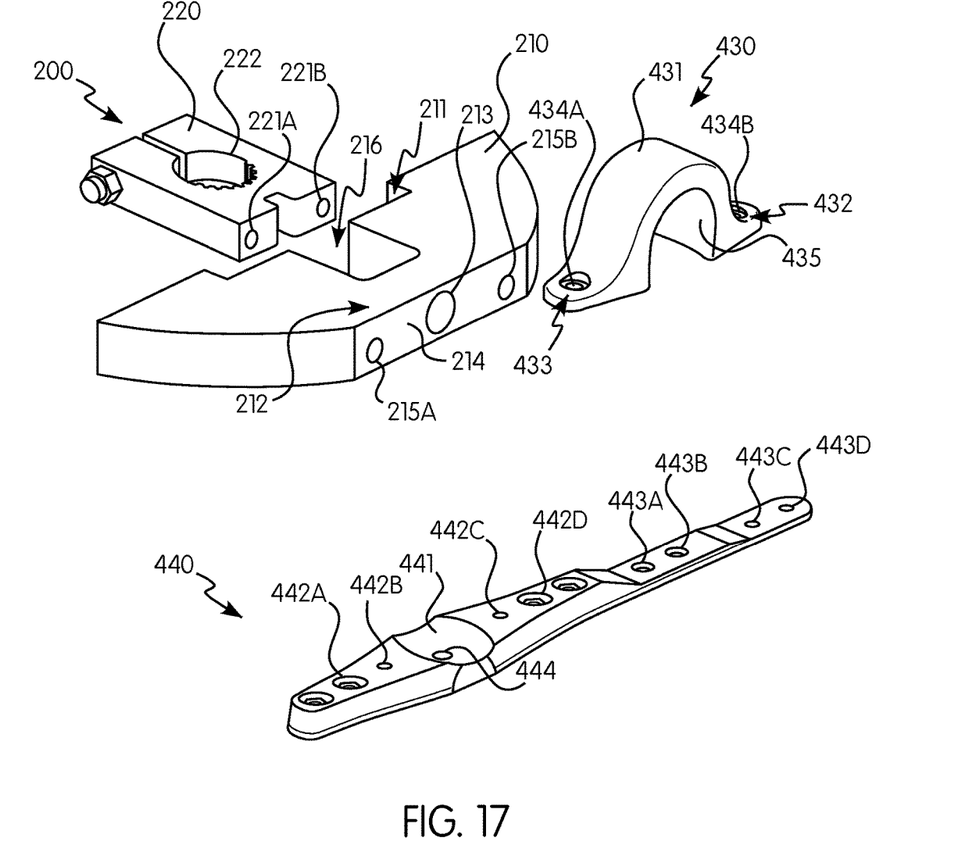
FIG. 17 is an exploded perspective view of a bearing assembly and knife head assembly applicable to the combine harvester of FIG. 1 in accordance with an exemplary embodiment of the subject disclosure.

Illustrated in FIG. 2B is a partial cross-sectional top schematic view of an exemplary embodiment of the cutting assembly 150A. The cutting assembly 150A comprises a drive arm assembly 200, a bearing assembly 300, and a knife head assembly 400. Illustrated in FIGS. 2A and 16 is a perspective view of the drive arm assembly 200, and illustrated in FIG. 17 is an exploded, perspective view of the drive arm assembly 200 and the bearing assembly 300.

With reference to FIGS. 2A, 2B, 16, and 17, the drive arm assembly 200 includes a drive arm 210 and a bracket 220, e.g., a mount. The drive arm 210 has a proximal end 211 operatively coupled to a drive mechanism 230 for reciprocating motion therewith and a distal end 212 opposite the proximal end for driving the knife head assembly 400. The bracket 220 couples the drive arm 210 to the drive mechanism 230. Although FIGS. 2A, 2B, 16, and 17 illustrate the drive arm 210 and the bracket 220 as being separate components, the drive arm assembly 200 can alternatively be formed as a unitary component.

The drive arm assembly 200 further includes an output shaft 240 connected to and driven by the drive mechanism 230 (FIG. 2B). It is contemplated that the drive mechanism 230 may be an electric or hydraulic motor or a mechanical linkage that is connected to e.g., a power takeoff (PTO) of the combine 100. The output shaft 240 is configured as shown in FIGS. 2A and 2B. In an exemplary aspect, the output shaft 240 is cylindrical in shape and has ridges and channels disposed on the outer surface of the output shaft. It is appreciated by those skilled in the art, however, that the output shaft can have a different overall shape such as a rectangular prism. Drive mechanisms applicable to the present exemplary embodiments are disclosed in e.g., U.S. Patent Application Pub. No. 2016/0073586, the entire disclosure of which is incorporated by reference herein for all purposes.

In accordance with an exemplary embodiment, the drive arm 210 includes a gap 216 located centrally or substantially centrally to the body of the drive arm 210 for connection with the connecting bracket 220. The drive arm 210 has a trapezoidal or substantially trapezoidal shape having a shorter side near the distal end 212 and a longer side near the proximal end 211. The sides of the drive arm 210 are curved, but may alternatively be linear.

It is appreciated by those skilled in the art that the shape of the drive arm 210 may vary and may instead be a different shape, such as rectangular, circular, oval, and the like. Additionally, it is understood that the drive arm does not need to be planar and may include grooves or other features for engaging other elements or for the benefit of space concerns inside the header 102.

With particular reference to FIGS. 16 and 17, the drive arm 210 further includes a through hole 213 extending from the distal end 212 towards the proximal end 211 in communication with the gap 216. The through hole 213 extends through a distally facing side 214 of the drive arm. The drive arm also has a pair of through holes 215A, 215B extending from its distal end 212 to the proximal end 211 coinciding with a pair of screw holes 221A, 221B on the connecting bracket 220. In an exemplary embodiment, the screw holes 221A, 221B are threaded and the through holes 215A, 215B are clearance holes configured to align with the screw holes 221A, 221B to create a threaded connection. It is appreciated, however, that the connection can be configured in any other way known in the art, including, but not limited to, threading the through holes 215A, 215B or making the screw holes 221A, 221B as clearance holes.

The drive arm 210 is configured to attach to one or more brackets, such as the connecting bracket 220. The connecting bracket 220 is configured as best shown in FIGS. 2A, 2B, 16 and 17. Specifically, the connecting bracket has an aperture 222 designed to engage the output shaft 240. One such design could include ridges and channels circumscribing the inner surface of the aperture 222 that interconnect with the ridges and channels that circumscribe the output shaft 240. Additionally, the connecting bracket 220 could have a series of fasteners for engaging other components of the header 102. The connecting bracket 220 also has screw holes 221A, 221B on its side closest to the drive arm 210. In the exemplary embodiment, the screw holes 221A, 221B are threaded for receiving a threaded fastener.

While the foregoing describes the drive arm 210 and the connecting bracket 220 as separate pieces that connect the drive arm to the output shaft 240, alternatively, some or all of the bracketing components may be integrally formed together and/or with the drive arm 210 for connecting to the output shaft 240.

Referring now to FIGS. 2A-2C and 3-12, the bearing assembly 300 is configured as shown. The bearing assembly 300 includes an eccentric hub 310 attachable to the distal end 212 of the drive arm 210. The bearing assembly 300 also includes an annular bearing 320 (FIGS. 10-12) circumscribing the eccentric hub 310. The annular bearing 320 (e.g., spherical bearing) includes a spherical outer surface 321 and a recess, aperture or through hole 322 for receiving the eccentric hub 310 therethrough. As further discussed below, the spherical outer surface 321 is designed to fit within a cavity 411 of a housing. The eccentric hub 310 may be integrally formed with the spherical outer surface 321 but can alternatively be removably connected, e.g., by way of a fastener. In the exemplary embodiment, the eccentric hub 310 is designed to sit within the recess 322 of the annular bearing 320.

Figure 12:
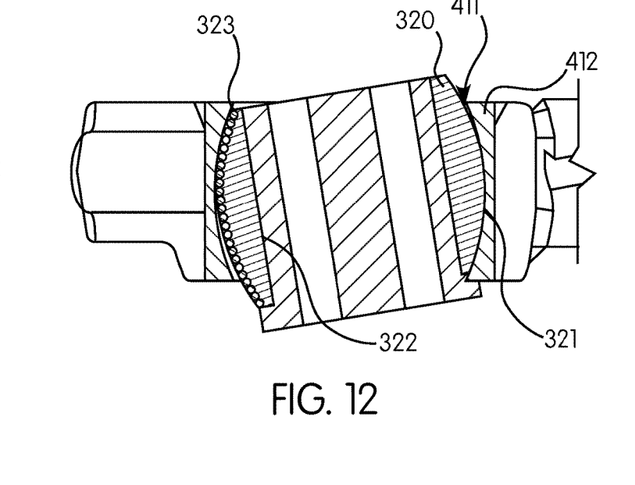
FIG. 12 is a cross-sectional top plan view of the bearing assembly and knife head assembly of FIG. 10 in a second operational position.
Figure 13:
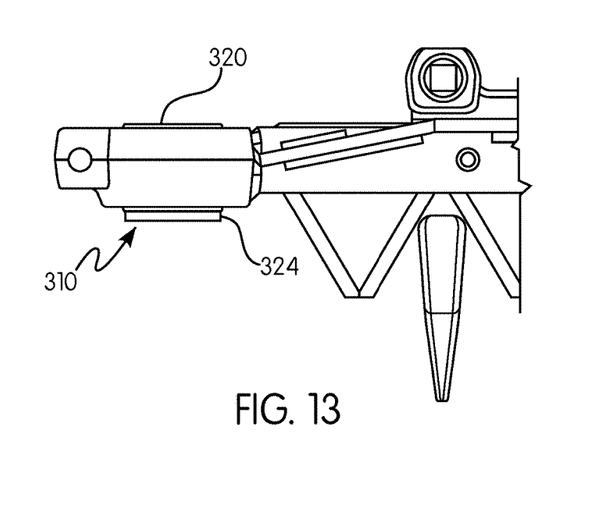
FIG. 13 is a top plan view of the bearing assembly and knife head assembly of FIG. 10.
Figure 14:
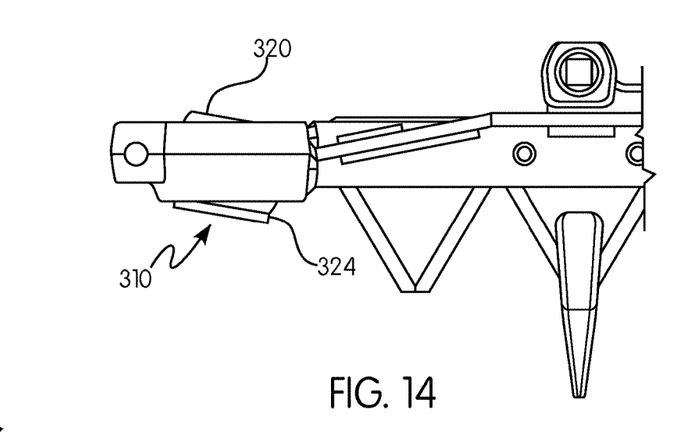
FIG. 14 is a top plan view of the bearing assembly and knife head assembly of FIG. 11.
Figure 15:
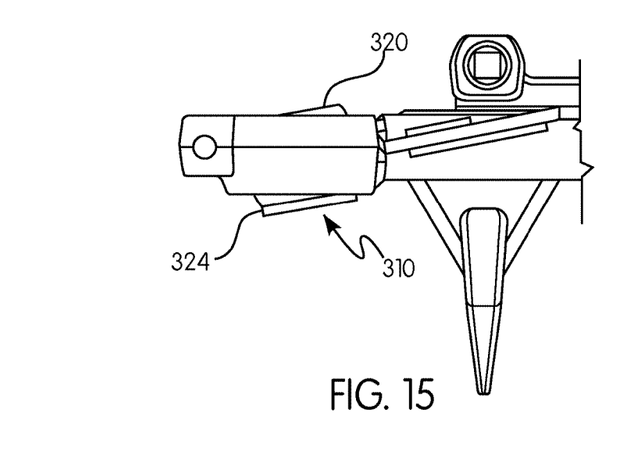
FIG. 15 is a top plan view of the bearing assembly and knife head assembly of FIG. 12.

In another exemplary embodiment illustrated in FIG. 12, the spherical outer surface 321 also includes an outer layer 323 surrounding the spherical outer surface 321. The outer layer 323 comprises roller bearings circumscribing the spherical outer surface 321. Alternatively, the outer layer 323 may instead be a layer of flexible material, for example a polymer, such as an elastomer, for absorbing forces on the spherical outer surface 321.

Figure 8:
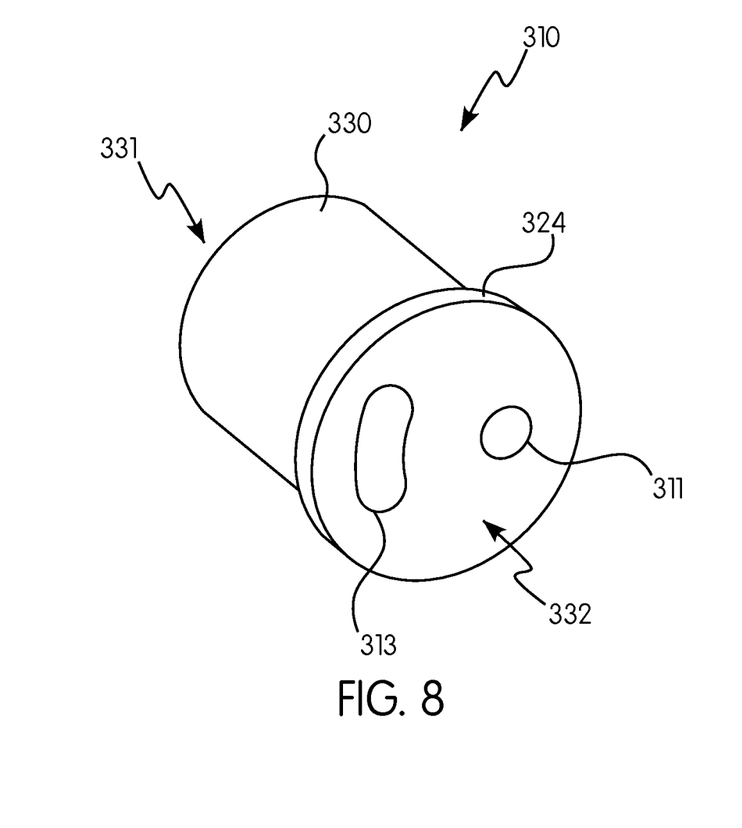
FIG. 8 is a perspective view of an eccentric hub of the bearing assembly of FIG. 3.
Figure 9:
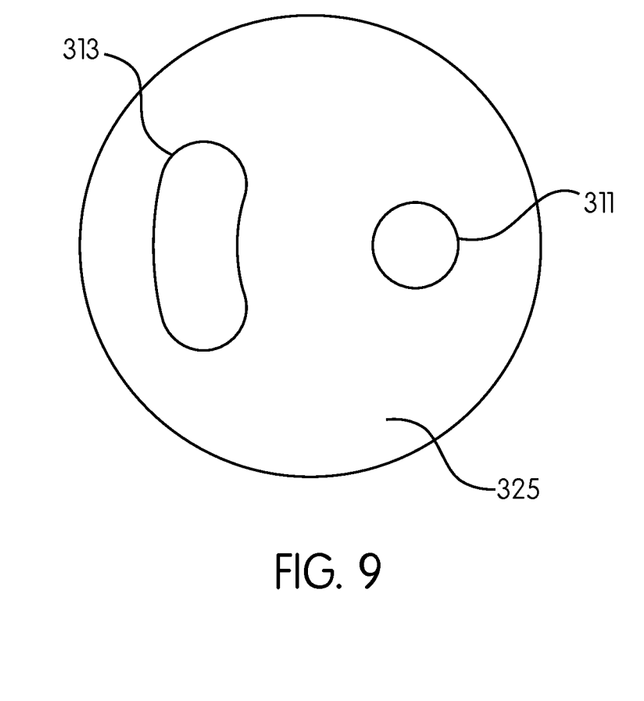
FIG. 9 is a front view of the eccentric hub of FIG. 8.

As shown in FIGS. 8 and 9, the eccentric hub 310 includes a flange 324 extending from an elongated shaft 330, e.g., a cylindrical body. The elongated shaft includes a proximal end 331 about a first end of the elongated shaft for securing to the drive arm 210, and a distal end 332 about a second end of the elongated shaft opposite the first end. The flange 324 is positioned about the distal end 332 of the elongated shaft.

The elongated shaft 330 is generally a cylindrical member having a longitudinal central axis and a circular cross-section. However, the elongated shaft 330 can have any shaped cross-section such as hexagonal, polygonal or any other shape suitable for its intended purpose. The elongated shaft can also be formed with a plurality of shaft segments having different cross-sectional diameters. However, the elongated shaft preferably has a uniform cross-sectional diameter. Generally, the elongated shaft 330 is illustrated as straight, although it may have a lordotic curve or be otherwise bent or curved. The elongated shaft may have any desired length sufficient for its intended purpose.

As previously discussed, the proximal end 331 is sized and configured to pass through the recess 322 of the annular bearing 320. In other words, the annular bearing 320 includes a recess for receiving the eccentric hub.

The flange 324 is a radially extending flange that extends from elongated shaft 330 and transverse to a longitudinal direction of the elongated shaft. The flange 324 has a diameter larger than the diameter of the elongated shaft. Additionally, the diameter of the flange 324 is greater than the diameter of the recess 322 of the annular bearing 320. With this configuration, the flange 324 allows the proximal end 331 of the elongated shaft 330 to pass through the recess 322 while limiting further axial movement of the elongated shaft beyond the flange. Preferably, the flange 324 is a radially outwardly extending circular flange, but may be any shaped flange suitable for its intended purpose.

In accordance with an aspect of the exemplary embodiment illustrated in FIGS. 6-9, the eccentric hub 310 includes a first through hole 311 configured to receive a first fastener 312 for connection to the drive arm 210, and a second through hole 313 configured to receive a second fastener 314. The first through hole 311 is offset from a central longitudinal axis 217 of the drive arm 210 when assembled thereto, and offset from a central longitudinal axis 315 of the eccentric hub. Additionally, the second through hole 313 is offset from the central longitudinal axis 217 of the drive arm 210 when assembled thereto, and offset from the central longitudinal axis 315 of the eccentric hub. Generally, the through holes 311, 313 are formed as a cylindrical recess or arcuate recess formed through the eccentric hub 310, wherein the through holes 311, 313 extend from a distal face 325 of the flange 324 to the proximal end 331 of the elongated shaft 330.

In accordance with an aspect of the exemplary embodiment illustrated in FIGS. 3-9, the second through hole 313 is configured as an elongated curved slot. In sum, the eccentric hub includes the first fastener connecting the eccentric hub to the drive arm and the second fastener connecting the eccentric hub to the drive arm. As further discussed below, the eccentric hub is movable between a first position and a second position relative to the second fastener.

In accordance with an exemplary embodiment, the fasteners 312, 314 are configured e.g., as mounting bolts. The mounting bolts 312, 314 are elongate and generally cylindrical, however, other cross-sectional shapes are contemplated including oval, rectangle, and irregular shapes. The mounting bolts may have any desired length sufficient for their intended purpose. Although the fasteners 312, 314 are configured as a mounting bolt, they can alternatively be configured as any other fastener suitable for the intended purpose. The mounting bolts secure the bearing assembly 300 to the drive arm 210.

In the exemplary embodiment of the subject disclosure, the bearing assembly 300 is connected to the distal end 212 of the drive arm 210 by the mounting bolts 312, 314 extending through the eccentric hub 310 seated within the annular bearing 320. Specifically, the mounting bolts 312, 314 extend through the first and second through hole 311, 313 extending from the distal end 332 of the flange 324 to the proximal end 331 of the elongated shaft 330. The first fastener 312 is fixedly connected to the drive arm 210 such that the eccentric hub 310 can rotate about a longitudinal axis of the first through hole. The connection between the first fastener 312 and the drive arm 210 provides a fixed point or axis 316 about which the eccentric hub 310 can rotate. The second fastener 314 is mounted to the drive arm 210 to adjustably secure the eccentric hub 310 at a desired position.

Figure 3:
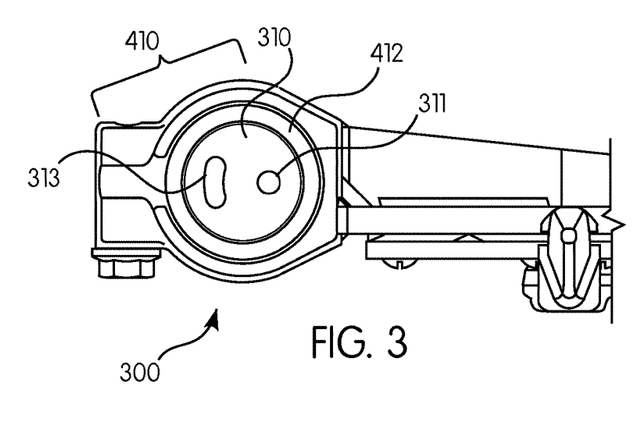
FIG. 3 is a front view of a bearing assembly and knife head assembly in accordance with an exemplary embodiment of the subject disclosure.
Figure 4:
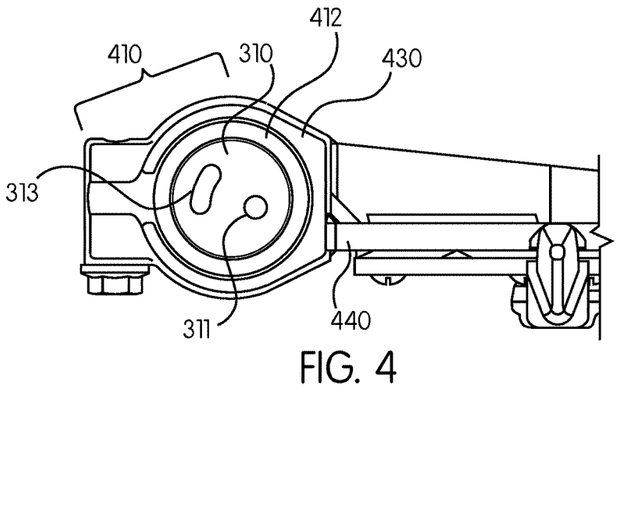
FIG. 4 is a front view of the bearing assembly and knife head assembly of FIG. 3 in a raised position.
Figure 5:
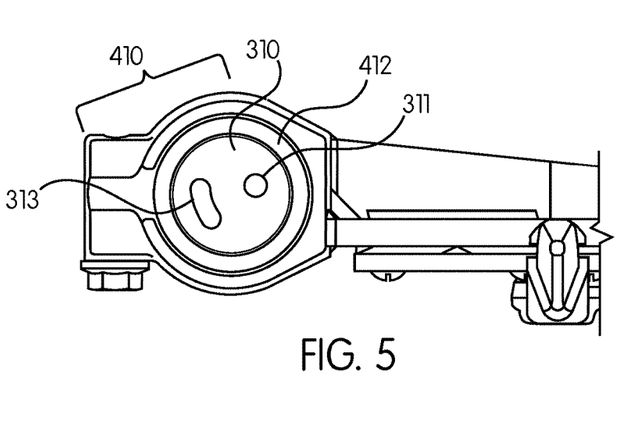
FIG. 5 is a front view of the bearing assembly and knife head assembly of FIG. 3 in a lowered position.
Figure 6:
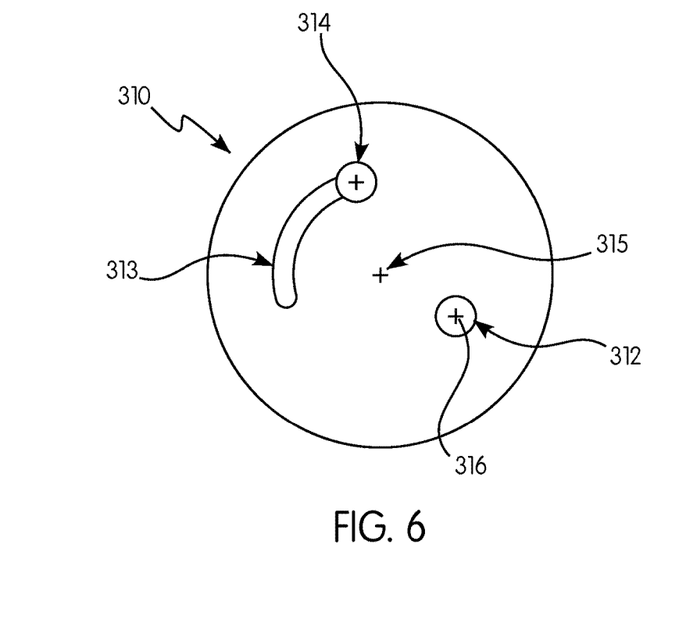
FIG. 6 is a schematic view of an eccentric hub of the bearing assembly of FIG. 2C.
Figure 7:
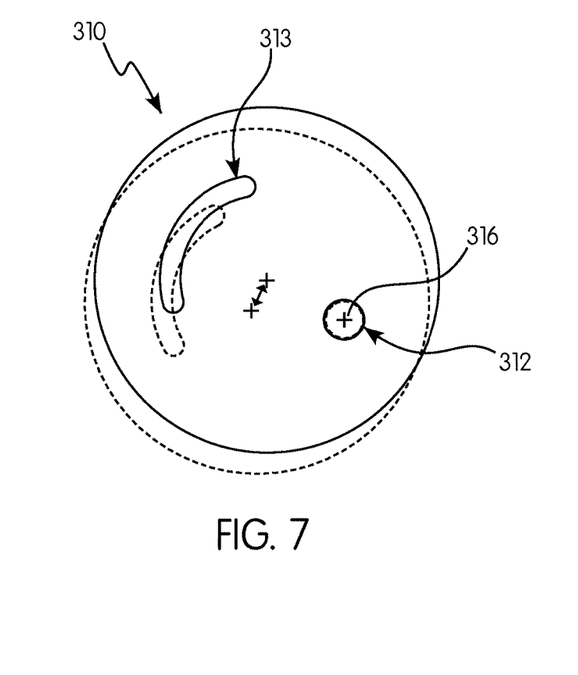
FIG. 7 is a schematic view of the eccentric hub of FIG. 6 in a raised position.

As a result, the eccentric hub 310 is rotatable relative to the drive arm 210. Specifically, the eccentric hub 310 is rotatable about an axis parallel or substantially parallel with a longitudinal axis of the drive arm 210. In accordance with an aspect, the eccentric hub 310 is rotatable about the longitudinal axis 316 aligned with the mounting bolt 312 in the first through hole 311. As shown in FIGS. 3-5 and discussed below, an operator can rotate and adjust the eccentric hub. The elongated curved slot of the second through hole 313 allows the eccentric hub 310 to be rotated and adjustably positioned between first and second positions relative to the first through hole. Thereafter, the second fastener 314 can be secured in position in accordance with a desired orientation. As further discussed below, rotation of the eccentric hub 310 allows an operator to adjust the height of the knife head assembly.

Figure 2C:
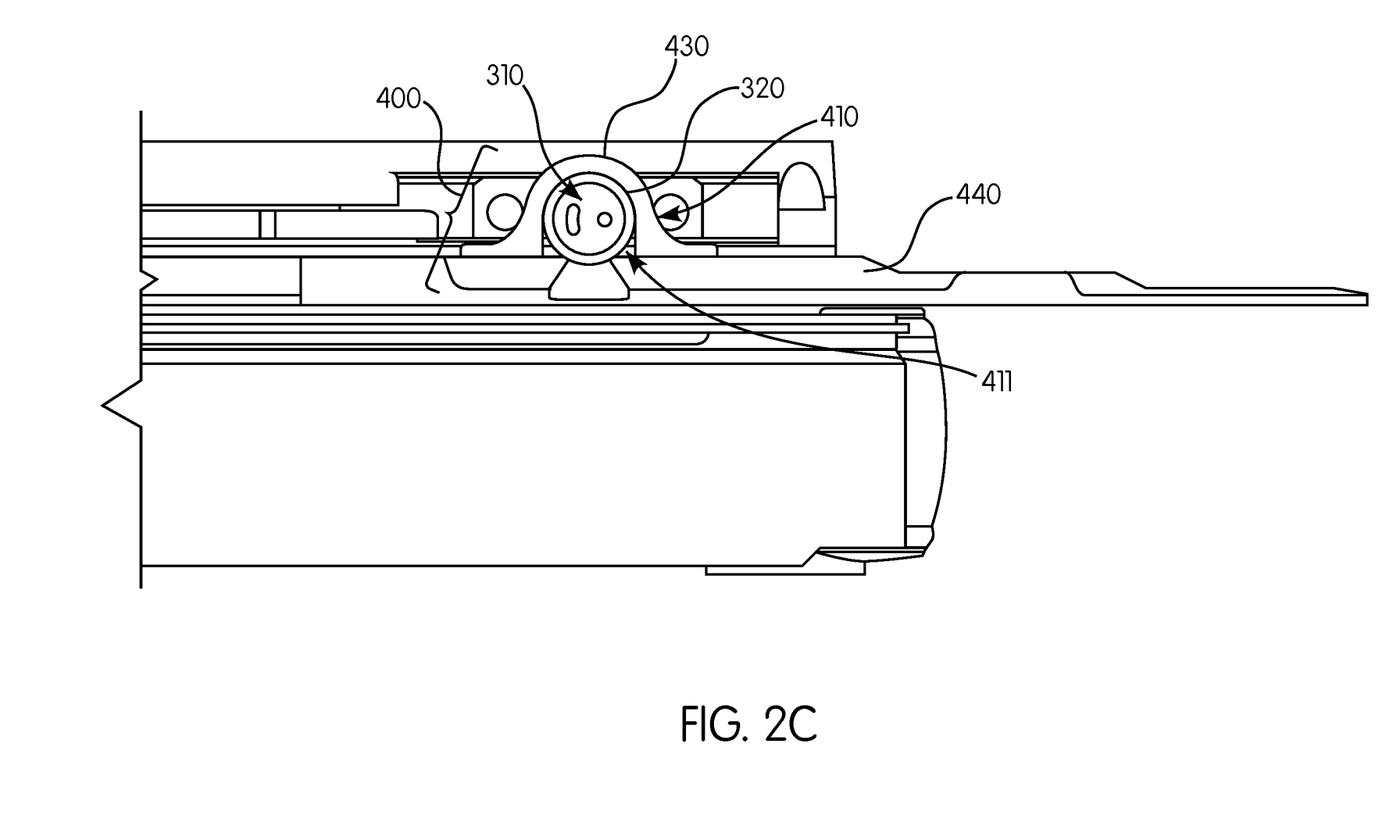
FIG. 2C is a partial front elevational view of a bearing assembly and knife head assembly of the drive arm assembly of FIG. 2A with certain parts omitted.

In accordance with an exemplary embodiment shown in FIGS. 2A-2C, the knife head assembly 400 includes a knife head 420 and a housing 410 mounted to the knife head 420. The housing 410 houses the bearing assembly 300 described above. Specifically, the housing 410 includes the cavity 411 (FIG. 12) for receiving the annular bearing 320.

Figure 10:
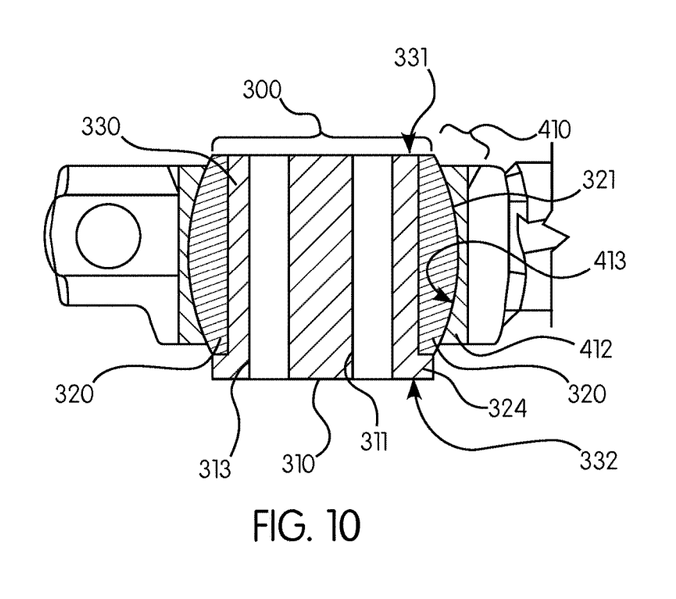
FIG. 10 is a cross-sectional top plan view of the bearing assembly and knife head assembly of FIG. 3.
Figure 11:
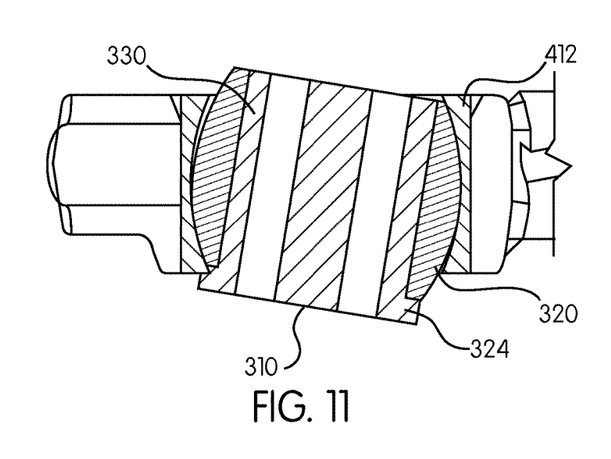
FIG. 11 is a cross-sectional top plan view of the bearing assembly and knife head assembly of FIG. 10 in a first operational position.

In accordance with an aspect of the exemplary embodiment illustrated in FIGS. 10-12, the housing 410 includes an inner bearing 412 for engaging with the spherical outer surface 321 of the annular bearing 320. Specifically, the inner bearing 412 includes a concave bearing surface or substantially concave bearing surface 413 shaped complementary to the spherical outer surface 321. The inner bearing 412 can be a roller bearing or an intermediate bearing layer.

Generally, the bearing assembly 300 and housing 410 are complementarily sized and shaped. In particular, the bearing assembly 300 is sized and shaped to fit and pivot within the cavity 411 of the housing. The shapes discussed below are exemplary; other shapes are possible so long as they are generally complementary such that the bearing assembly functions similarly. In other words, the annular bearing is mounted within the cavity defining a ball and socket joint. As such, the annular bearing 320 is mounted within the housing 410 defining a ball and socket joint.

Although the housing can be formed as a unitary member, the housing 410 can be collectively formed by a clamping portion 430 and a mounting bar 440 (FIG. 2C). Alternatively, the housing 410 can be integrally formed with the mounting bar.

Referring now to FIGS. 2A-2C, 3-5, 10-15 and 17, the mounting bar 440 is configured as shown. The mounting bar 440 has a longitudinal length extending parallel or substantially parallel or aligned with the cutter bar 150A when assembled thereto, a concave portion 441, one or more apertures 442A-D for receiving fasteners for connecting the clamping portion 430 thereto and one or more apertures 443A-D along the longitudinal length of the mounting bar 440 for fastening a cutter bar (not shown), such as a cutter bar disclosed in U.S. Pat. No. 8,051,633, the entire disclosure of which is incorporated by reference herein for all purposes, to the mounting bar 440. Additionally, the concave portion 441 may also include an aperture 444 for further securing the annular bearing within the cavity 411. Alternatively, the aperture 444 may be instead be replaced by other suitable fasteners, such as an adhesive or other mechanical fastener.

Referring now to FIGS. 2C, 3-5 and 17, the clamping portion 430 is configured as shown. The clamping portion 430 has an outer surface 431 that is arcuate in shape with two ends 432, 433 and apertures 434A, 434B. The clamping portion 430 further has a concave portion 435 that is also arcuate in shape between the two ends 432, 433 on an inside surface of the clamping portion. The concave portion 435 is designed to receive the annular bearing. The concave portion 435 is further configured to overlap and be in communication with the concave portion 441 of the mounting bar 440. Accordingly, when the clamping portion 430 and mounting bar 440 are secured together, they collectively form the cavity 411. Additionally, the apertures 434A, 434B at the two ends 432, 433 are designed such that they overlap with the apertures 442A-D of the mounting bar 440.

While it is desired that the clamping portion 430 and concave portion 435 be arcuate in shape, the clamping portion 430 may be any other shape suitable such as a square, trapezoid, and so forth. However, it is appreciated that the design of the clamping portion 430 and concave portion 435 is such that it may efficiently be assembled with the mounting bar 440 and bearing assembly 300 and so that the annular bearing 320 is securely held in place inside the cavity 411.

In accordance with an exemplary embodiment, the apertures 442A-D, 443A-D, 444, 434A, 434B of the mounting bar 440 and clamping portion 430 are through holes configured to receive dowels by way of press-fit for securing the bearing assembly 300, the mounting bar 440, and the clamping portion 430 together. However, instead of apertures and dowels, alternative mechanisms for connecting two or more elements such as, for example, screws, bolts, rivets, and the like may be used. Additionally, it is appreciated that the apertures 442A-D, 443A-D, 444 do not all have to be incorporated into the subject disclosure and can be omitted if they are unnecessary, such as, for example, the aperture 444.

It is appreciated by those skilled in the art that the drive arm 210, bearing assembly 300, mounting bar 440 and clamping portion 430 may be integrally formed with one another, and/or their individual components such as the spherical outer surface 321, in several manners without departing from the scope of the subject disclosure. For example, in an exemplary embodiment, the drive arm 210 and bearing assembly 300 are integrally formed, in another exemplary embodiment, the bearing assembly 300 and clamping portion 430 are integrally formed; and in yet another exemplary embodiment, the clamping portion 430, the spherical outer surface 321 and the mounting bar 440 are integrally formed, and so forth.

With reference now to FIGS. 2A-2C, 3-5 and 10-15, there is illustrated an assembled drive arm assembly 200 and knife head assembly 400 in accordance with an exemplary embodiment of the subject disclosure. With respect to the drive arm assembly 200, the drive mechanism 230 is operatively connected to the output shaft 240 and the output shaft is connected to the drive arm 210.

In the exemplary embodiment of the subject disclosure, the bearing assembly 300 is connected to the distal end 212 of the drive arm 210 by the mounting bolts 312, 314 extending through the eccentric hub 310 seated within the annular bearing 320. As previously discussed and illustrated in FIGS. 3-7, rotation of the eccentric hub 310 moves the knife head assembly 400 between a first position and a second position.

With respect to the knife head assembly 400, the annular bearing is positioned over the concave portion 441 of the mounting bar 440. The clamping portion 430 is fastened over the annular bearing to secure it to the mounting bar 440. However, it is appreciated by those skilled in the art that the connection may be accomplished in any number of ways including, but not limited to, screws, welding, hooks, clasps, grooves, rivets and receiving holes and so forth.

In sum, the mounting bar 440 and the clamping portion 430, with the cavity 411, securely fasten the bearing assembly 300 such that the movement of the bearing assembly 300 is minimized. However, while bearing assembly 300 is secured, pivotable motion is permitted between the spherical outer surface 321 and the bearings around it.

Referring now to FIGS. 2A-2C and 10-15, in operation, as the drive mechanism 230 is engaged in reciprocating rotational motion, the rotational motion is transferred to the output shaft 240 which begins to rotate in reciprocating fashion. As the output shaft 240 rotates, the connecting bracket 220, which is secured to the output shaft 240, transfers the rotational motion to the drive arm 210 and the drive arm 210 arcs in a reciprocating longitudinal direction. As the drive arm 210 engages in reciprocating arcing motion, the bearing assembly 300 correspondingly arcs. Because the bearing assembly 300 is held by the housing 410 in a ball and socket joint-like manner, the bearing assembly 300 pivots within the cavity 411. As the bearing assembly 300 pivots, it transfers reciprocating motion to the knife head assembly 400. Consequently, the knife head assembly 400 engages in reciprocating linear motion generally in a longitudinal direction of the knife head. In other words, the reciprocating motion of the drive arm assembly 200 drives linear motion or substantially linear motion of the knife head assembly 400 along a direction parallel or substantially parallel to a longitudinal length of the knife head 420.

It will be appreciated by those skilled in the art that linear motion can be reinforced with the addition of linear bearings on the mounting bar. The benefit of having a ball and socket joint with varying degrees of freedom is that it is not restricted from accommodating unforeseen and unexpected forces. For example, as a combine harvester travels over an uneven terrain of a field, there will be additional forces pushing up and down against the cutter bar at varying focal points. A rigid joint would face those forces and fail much quicker than a ball and socket joint that can accommodate such forces by pivoting in the appropriate direction. Thus, the cutting assemblies of the exemplary embodiments advantageously have an improved life expectancy and operate more efficiently while reducing potential for mechanical failure issues compared to conventional cutter bar assemblies.

It is desirable that the bearing assembly 300 be easily replaced by an operator. In the subject disclosure, the mounting bar 440 and the clamping portion 430 (collectively, the housing 410) can be separated by removing the dowels from the clamping portion and mounting bar apertures 442A-D, 434A, 434B. The bearing assembly 300 can then be easily removed from the drive arm 210 by removing the mounting bolts 312, 314. Thereafter, the bearing assembly can be easily replaced and the drive arm assembly 200 and the knife head assembly 400 can be reassembled.

While the subject disclosure has been described with reference to exemplary embodiments, it will be appreciated by those skilled in the art that various changes may be made and equivalents may be substituted for elements thereof without departing from the scope of the subject disclosure. For example, features described in one embodiment may be incorporated into a different embodiment, such as the use of bearings around the bearing element and/or inside the cavity. Additionally, features described in one manner may alternatively be accomplished by other techniques, such as pivotable connections.

In addition, modifications may be made to adapt a particular situation or material to the teachings of the exemplary embodiments without departing from the essential scope thereof. For example, the headers and knife drives may only utilize a single cutter blade or two or more cutter blades, or be located centrally to the header or on the side of the header, the bearing assembly, clamping portion, drive arm, and mounting bar may be non-uniformly shaped or be non-planar. It is to be understood, therefore, that the exemplary embodiments not be limited to the particular aspects disclosed, but it is intended to cover modifications within the spirit and scope of the subject disclosure as defined by the appended claims.

I claim:

1. A header for a combine harvester comprising:
    a drive arm assembly including:
        a drive arm having:
            a proximal end operatively connected to a drive mechanism for reciprocating motion therewith, and
            a distal end opposite the proximal end, and
        a bearing assembly attachable to the distal end of the drive arm, the bearing assembly having an eccentric hub; and
    a knife head assembly including:
        a knife head, and
        a housing mounted to the knife head, wherein the housing houses the bearing assembly.

2. The header of claim 1, wherein the bearing assembly further includes an annular bearing circumscribing the eccentric hub.

3. The header of claim 2, wherein the annular bearing includes a spherical outer surface.

4. The header of claim 3, wherein the housing further includes a cavity for receiving the spherical outer surface of the annular bearing.

5. The header of claim 1, wherein the housing further includes an inner bearing for engaging with the bearing assembly.

6. The header of claim 5, wherein the inner bearing includes a substantially concave bearing surface.

7. The header of claim 2, wherein the annular bearing is mounted within the housing defining a ball and socket joint.

8. The header of claim 1, wherein the eccentric hub includes a flange extending from an elongated cylindrical body.

9. The header of claim 1, wherein the eccentric hub is rotatable relative to the drive arm.

10. The header of claim 1, wherein the eccentric hub is rotatable about an axis substantially parallel with a longitudinal axis of the drive arm.

11. The header of claim 1, wherein the eccentric hub includes:
    a first through hole configured to receive a first fastener for connection to the drive arm, and
    a second through hole configured to receive a second fastener.

12. The header of claim 11, wherein the first through hole is offset from a central longitudinal axis of the drive arm.

13. The header of claim 11, wherein the second through hole is offset from a central longitudinal axis of the drive arm.

14. The header of claim 11, wherein the eccentric hub is rotatable about a central longitudinal axis of the first through hole.

15. The header of claim 11, wherein the second through hole is an elongated curved slot.

16. The header of claim 1, wherein rotation of the eccentric hub moves the knife head assembly between a first position and a second position.

17. The header of claim 1, wherein reciprocating motion of the drive arm assembly drives substantially linear motion of the knife head assembly along a direction substantially parallel to a longitudinal length of the knife head.

18. The header of claim 1, wherein the housing is integrally formed with the knife head.

19. A drive arm assembly for a combine harvester comprising:
    a drive arm having:
        a proximal end for operative connection to a drive mechanism for reciprocating motion therewith, and
        a distal end opposite the proximal end; and
    a bearing assembly attachable to the distal end of the drive arm, the bearing assembly having an eccentric hub mounted within an annular bearing having a curved outer surface.

20. A header for a combine harvester comprising:
    a drive arm assembly including:
        a drive arm having:
            a proximal end operatively connected to a drive mechanism for reciprocating motion therewith, and
            a distal end opposite the proximal end, and
        a bearing assembly attachable to the distal end of the drive arm, the bearing assembly having an eccentric hub that includes:
            a first through hole,
            a first fastener extending through the first through hole connecting the eccentric hub to the drive arm,
            a second elongated curved slot through hole, and
            a second fastener extending through the second elongated curved slot through hole connecting the eccentric hub to the drive arm,
            wherein the eccentric hub is movable between a first position and a second position relative to the second fastener; and a knife head assembly including:
  a knife head, and
  a housing mounted to the knife head, wherein the housing houses the bearing assembly.

* * * * *